(12) United States Patent
Dangi et al.

(10) Patent No.: US 6,714,959 B1
(45) Date of Patent: Mar. 30, 2004

(54) SYSTEM AND METHOD FOR OPTIMIZING INSERTIONS FOR TIMER QUEUE OPERATIONS

(75) Inventors: Salil Dangi, Mission Viejo, CA (US); Roger Andrew Jones, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 562 days.

(21) Appl. No.: 09/602,692

(22) Filed: Jun. 23, 2000

(51) Int. Cl.[7] ................................ G06F 9/00

(52) U.S. Cl. .................. 709/102; 709/107; 713/600; 710/54

(58) Field of Search ................ 709/100, 102, 709/104, 107, 310, 314; 710/54, 56; 713/500, 501, 502, 503, 600, 601

(56) References Cited

U.S. PATENT DOCUMENTS

| | | | | |
|---|---|---|---|---|
| 5,721,891 A | * | 2/1998 | Murray et al. | 713/600 |
| 5,740,467 A | * | 4/1998 | Chmielecki, Jr. et al. | 710/56 |
| 5,758,137 A | * | 5/1998 | Armstrong, Jr. et al. | 713/502 |
| 6,032,207 A | * | 2/2000 | Wilson | 710/54 |
| 6,052,737 A | * | 4/2000 | Bitton et al. | 709/248 |
| 6,466,978 B1 | * | 10/2002 | Mukherjee et al. | 709/225 |

* cited by examiner

*Primary Examiner*—John Follansbee
*Assistant Examiner*—V. H. Nguyen
(74) *Attorney, Agent, or Firm*—Alfred W. Kozak; Nathan Cass; Mark T. Starr

(57) ABSTRACT

A circular queue is created with N Fixed Timer Entries associated with a specific address pointer for each entry. An association is developed to relate each fixed entry pointer to its just previous pointer and to its just next occurring pointer. A selected transient New Timer Entry can be inserted between any two selected adjacent Fixed Timer Entries without need to sequence serially through the entire set of fixed entries.

6 Claims, 9 Drawing Sheets

BEFORE NTE

**AFTER NTE
(1) REPRESENTS 1 TICK**

SYSTEM AND METHOD FOR OPTIMIZING INSERTIONS FOR TIMER QUEUE OPERATIONS

CROSS REFERENCE TO RELATED APPLICATIONS

The application is related to a copending application U.S. Ser. No. 09/602,693 filed Jun. 23, 2000, entitled "Deletion System and Method for Circular Queue Operations" and is incorporated herein by reference.

FIELD OF THE INVENTION

The present system describes methods for use and flexibility in scheduling events in computers and system networks whereby improved methods of scheduling events are provided.

BACKGROUND OF THE INVENTION

In many computer networks, computerized telephone and billing systems, there is intercommunication mechanisms in computers and other types of systems which handle multiple events are often presented with the problem of scheduling a certain event to happen at a particular time which is to be arranged for set-up in the system.

Many memory systems for example, have queues of items to be accessed or handled in a particular sequence. Many programs have lists of instructions which are sequenced also to be handled in a particular arrangement of time events. Sometimes, thousands of different items are placed in queues in order to be available for access in a particular sequence or order.

For example, in the compilation of a telephone directory or a directory of certain businesses in a certain location or a directory of the names of people associated with a certain group, these are all examples of data words or information which are placed in queues and which may be accessed, acquired and used at certain moments of time.

Additionally, once such a list is compiled, it is very often necessary to place insertions into the queue list, for example, new person's names may be added to a group organization list, or new telephone numbers and addresses and names may be put in a telephone book. Similarly, and often in Kerberos Security Systems, a list of authenticated users and appropriate passwords and tickets may be involved in a list of such useful items.

In each and any of the cases, when it is necessary to add to a particular list, it is sometimes a rather magnitudinous task to achieve this type of event when there is required the normal situation where the system must check through each of the items in the list step-by-step until it reaches its selected position where the insertion must be made, after which a stop operation must occur after which the new item is inserted into the system and which performs the completion of this operation. However, in so doing, sometimes thousands and thousands of entries must be sequenced through to find the exact point where the new insertion is to be made. This is very time-consuming and exceedingly complex in terms of programming the event to be inserted at a particular point in a large sequence of items in a list.

The normal method for this to happen is that there be a sequential scan of each item, item-by-item, step-by-step, until there is reached or achieved the proper insertion point. Thus, the performance cost of queue searching for insertion events which need to be handled at some fixed time in the future, is quite an expensive proposition. However, the queues which must be scanned sequentially are used very often for these purposes because they are simple to implement and maintain, and can reflect the linear nature of the problem to be solved in finding the correct placement point or item into which the new event is to be inserted. Additionally, such a technique is inherently slow, and thus also becomes increasingly costly, as more entries are added to the queue, and considerable time latency factors are involved in the mechanism which of must traverse through the queue in order to find the right new entrance point.

Traditionally, time events are maintained in a queue structure, and each timer event has a value associated with it. The value of the timer event determines when the event would or should happen after the previous timer event has happened.

As an example, if five events are to happen at t+3, then t+8, then t+45, then t+55, then t+56, (where "t" is current time), then as an example, the queue may be considered to look as follows:

TE(3) - - - TE(5) - - - TE(37) - - - TE(10) - - - TE(1)
    Where "t" is the current time and the (X) represents the added time, for example in seconds, which indicates the event occurring just after the previous event has occurred.

In this particular operation, after one tick of time has occurred (that is to say, at t+1), then the timer queue could be represented to look as follows:

TE(2) - - - TE(5) - - - TE(37) - - - TE(10) - - - TE(1)
    The difference here, is that the first item has now changed from TE(3) to now be TE(2).

With this type of scheme being used, it is seen to be very time-consuming to insert a timer event in the queue, since the timer entries need to be scanned from the "start" of the queue until the correct place is found. For example, if a New Timer Event (NTE) is to be added, for example, which is to happen after 48 ticks, then the entries of the timer queue will need to be scanned until an event is found which will happen after 48 ticks, and then the New Timer Event (NTE) needs to be inserted just prior to that event. Thus, in the above example, it would be necessary to scan step-by-step for entries.

Thus, in the above example, the timer queue after the new event insertion will now appear as shown below:

TE(2) - - - TE(5) - - - TE(37) - - - TE(4) - - - NTE(6) - - - TE(1)
    Thus, the New Timer Event insertion which is TE(6) required the scanning of four previous entries.

Now, in the situation where the queue has thousands of entries, this type of operation will be seen to be very time-consuming in order to provide for a new event insertion.

The present invention involves a method for managing timer events which does not require any scan of the existing entries in the queue, and as a result, provides for an extensive speeding-up for handling the insertion of events in a queue. The new method uses the operation of the timer queue as if it were maintained as a circular queue. Here, the circular queue would have "N" permanent entries, where "N" is a chosen number, but an arbitrary one depending on the number of permanent entries or FTE fixed time entries that one would like to configure into the queue. Also, the number "N" then determines the maximum number of timer events that can be handled by this type of configuration.

For example, if the timer "tick" or "period" between events is 100 milliseconds, and "N" is 9,000, then this queue will then be capable of handling any timer event over a period of 15 minutes. Now, since 100 milliseconds is 1/10th of a second, and 9,000 would equate to 900 seconds, then with 60 seconds to the minute, it is seen that 900 seconds would be equivalent to 15 minutes.

SUMMARY OF THE INVENTION

The present method provides for the maintenance of a timer queue as a circular queue which has "N" permanent entries which are designated as Fixed Timer Entries (FTEs). The chosen number for the configuration, which is the number "N", determines the maximum number of timer events that can be handled.

The method involves allocating "N" timer event entries and assigning a timer value of "1" to each of these timer events. These timer entries are linked to form a circularly linked list and the addresses of these timer entries are saved in an array which is used to access the fixed elements of the queue directly.

A current Timer Index is assigned so that this is equivalent to the current time in ticks, multiplied by the mod list "N".

The next step involves an entry insertion which involves converting the event time to "ticks" and if the ticks are greater than "N", then an exit is required since the system cannot handle more than "N". The next step is to allocate a timer event entry, to assign a timer value of "0" to this entry, then to assign a handle to this entry. The index will be inserted at "Timer Index", with the assigned value of (CURRENT_TIME_IN_TICKS+NEW_TIMER_TICKS) mod "N". Then, there is made an insertion of this timer entry prior to the timer entry which is pointed by Timer Index within the timer Q.

GLOSSARY

Figure 1:
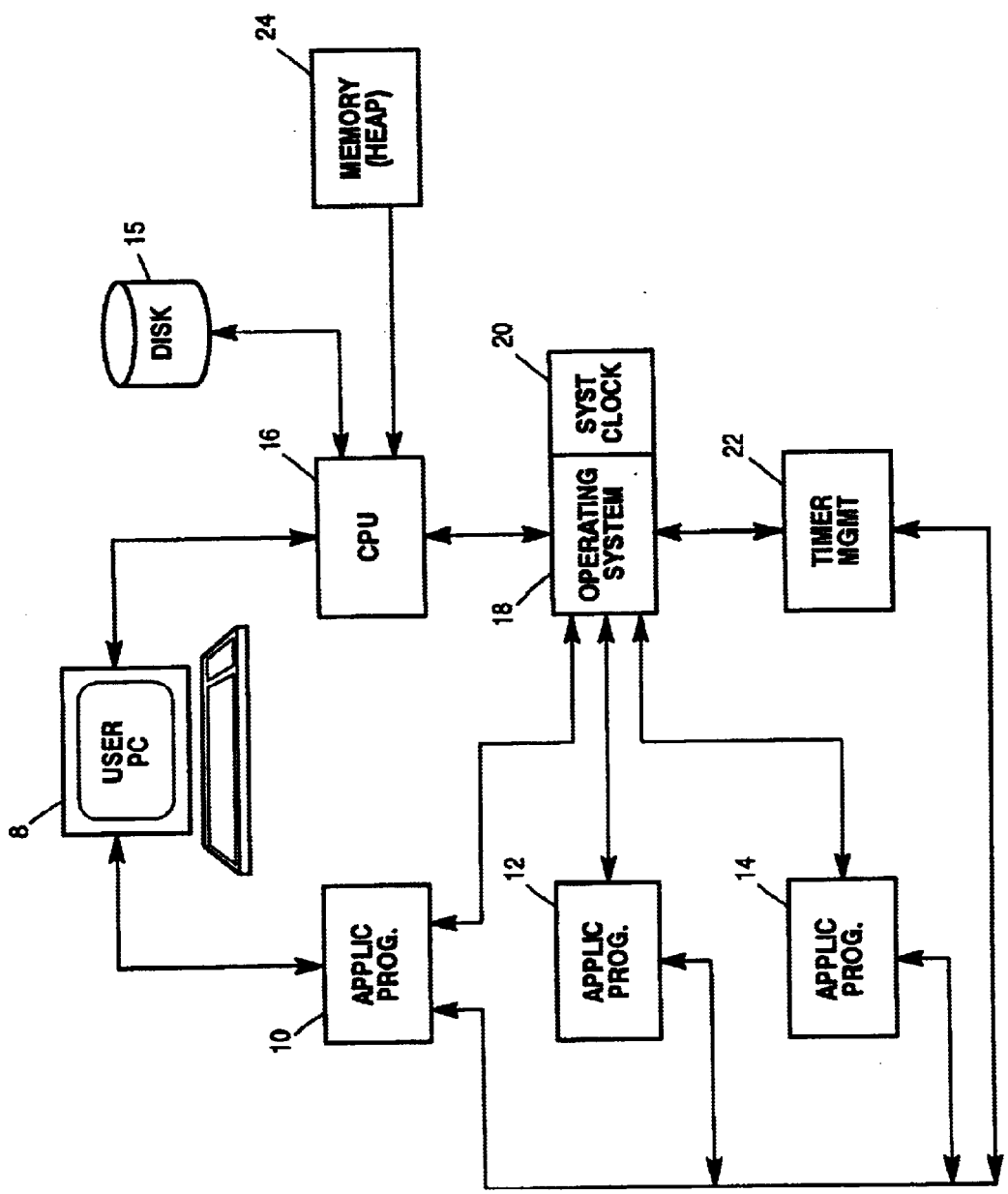
FIG. 1 is a block diagram showing an example of a system network which makes use of queue events.

ADDRESS ARRAY: An array of pointers where each pointer references a particular address in memory.
ARRAY INDEX: One entry within an array. The Array Index i within array A is denoted A[i].
CIRCULARLY LINKED LIST: A linked list wherein the last item is followed by the first item, thus forming a circle.
CLOCK: In computer circuitry, the electronic circuit that generates a steady stream of digital timing pulses that synchronize operations.
CURRENT TIME (t): The present System clock time, used to determine the Current Timer Index.
CURRENT TIMER INDEX: The current position, or index, in a Timer Queue. Calculated by Current time in ticks mod N.
DELETE REQUEST: A request to delete a Transient Timer Entry (TTE) from a Timer queue. Contains a handle referencing the Transient Timer Entry to delete. TTE is also referred to as New Timer Entry (NTE).
ENTRIES IN QUEUE: The entities making up a queue, such as individual people standing in line.
ENTRY: A requested process.
ENTRY INSERTION: See Timer Entry Insertion.
EVENT: The occurrence of the process associated with an Entry.
FIXED TIMER ENTRY (FTE): The fixed entries of a Timer Queue. Weight is always one Timer Tick. The FTE is also later designated as TE_THIS.
HANDLE: A reference to an address in memory. Used to uniquely identify Transient Timer Entries (TTES, NTEs) inserted into a Timer Queue. Handles do point to something but how the pointer is derived is up to the handle builder, e.g. a timer_handle could contain an index to an internal table where the timer related information is stored and a random number which is also stored in the same table. This will permit the handle builder to identify bogus handles as the caller will need to know both the index and a random number stored at that index.
INSERT REQUEST: A request to insert a New Timer Entry (NTE) or a Transient Timer Entry (TTE) within a Timer Queue. Contains a Timeout value and parameter(s) specifying what the requested Entry will do.
LINEAR QUEUE METHOD: A method for inserting entries within a Queue. This method does not use Timer Entries. Instead, entries contain an event time and event parameters. Entries are sorted by event time. A new entry must iteratively search through the existing entries before entering the Queue. Due to the iterative search, adding new entries is an expensive operation.
MOD N: The remainder from doing a whole number divide by n, allowing Fixed Timer Entries (FTEs) to map into a Timer Queue. The Fixed Timer Entries (FTEs) are distinguished from later "inserted" New Timer Entries (NTEs), also called Transient Timer Entries (TTEs). The Transient Timer Entries are also called a New Timer Entries or NTE.
N: The number of fixed entries in a Queue.
NEW ENTRY INSERTION: See Timer Entry Insertion. Also called New Timer Entry (NTE) Insertion, and sometimes referred to as Transient Timer Entry (TTE) Insertion.
NEW TIMER ENTRY (NTE): A Timer Entry a client requests to be processed, typically a Transient Timer Entry, or TTE.
NEXT: Pointer pointing to the next Timer Entry from the just previous pointer.
P1. P2 PARAMETERS: Parameters that specify what Event will take place. P1 represents the procedure of the Event. P2 represents the parameter passed into the P1 procedure.
POINTER: Points to an item, using a reference to an address in memory.
PREV: Pointer pointing to the previous Timer Entry.
QUEUE: A data construct processed in first-in, first-out (FIFO) order, similar to people waiting in line.
QUEUE STRUCTURE: An implementation of a Queue.
SYSTEM CLOCK: A computer's clock, tracking date and time of day, used to determine the Current time.

TIMEOUT: A time format that must first be converted into Timer Ticks. The format can be in System clock time, hours, minutes, seconds, etc.

TIMER: A device used to keep track of processing time.

TIMER ENTRY (TE): An Entry designated with a Weight, event parameters P1 and P2, a Prev pointer, and a Next pointer. Prev and Next pointers are used to form a Circularly linked list. Timer Entries can be Fixed Time Entries (FTE) or Transient Timer Entries, TTE (also called NTE or New Timer Entry).

TIMER ENTRY INSERTION: The process of inserting a Transient Timer Entry in between Fixed Timer Entries in a Timer Queue.

TIMER ENTRY MANAGEMENT: Processing Entries based on sequential time arrangements.

TIMER INDEX: The position, or index, within a Timer Queue

TIMER Q: An instance of a Timer Queue.

TIMER QUEUE: A Queue Structure consisting of Timer Entries, implemented as a Circularly linked list.

TIMER QUEUE INDEX ARRAY: An Address array whose pointers map directly to the Fixed Timer Entries of a Timer Queue.

TIMER TICK: The fixed unit of time for a Timer Queue.

TRANSIENT TIMER ENTRY (TTE): A Timer Entry associated with an event. Weight is always 0, P1 and P2 parameters specify what Event will take place. Also called a New Timer Entry or NTE.

WEIGHT: The number of Ticks representing how long a Timer Entry lasts. (1) represents 1 tick. A (0) represents no ticks (zero ticks).

GLOSSARY FOR FIG. 5 (QUEUE CREATION)

NEXT=the NEXT pointer of a particular TE.

PREV=the PREV pointer of a particular TE.

COUNT=the current number of FTE's that have been created. This should equal N when Queue Creation completes, i.e., COUNT=N when an FTE has been created for each index within the Address Array.

N=the size of TQ (Timer Queue). The number of FTE's in a circular queue.

TE_PREV=references the TE previous to TE_THIS.

TE_THIS=a new instance of a FTE. One will be created for each index in TQ.

TQ=a new instance of a Timer Queue Index Array. Used for insert and delete operations.

TQ[0]=the $0^{th}$ index in TQ (Timer Queue).

TQ[COUNT-1]=the $(COUNT-1)^{th}$ index in TQ.

TQ[N-1]=the $(N-1)^{th}$ index in TQ.

GLOSSARY FOR FIG. 6 (INSERT OPERATION)

.HANDLE=the handle referencing a particular TE.

.NEXT=the NEXT pointer of a particular TE.

.P1=the P1 parameter of a particular TE.

.P2=the P2 parameter of a particular TE.

.PREV=the previous pointer of a particular TE.

.WEIGHT=the WEIGHT value of a particular TE.

TE_NEW=a new instance of a TTE. This is the entry to be inserted. Also referred to as New Timer Entry (NTE).

TE_PREV=references the TE that TE_NEW will be inserted after.

TE_NEW=the New Timer Entry (NTE) to be inserted. This is also called Transient Timer Entry or TTE.

TE_THIS=references the FTE that TE_NEW will be inserted before.

TH_NEW=a handle referencing TE_NEW.

DESCRIPTION OF PREFERRED EMBODIMENT

A typical example of a digital and computer operating system which may be involved with the use of queues, it illustrated in FIG. 1. For example, several different application programs shown as 10, 12, and 14 are initiated by the personal computer user 8, which also communicates with the Central Processing Unit 16. The Central Processing Unit 16 is connected to a disk unit 15 which supplies instruction codes and other data and information to the CPU. The CPU also communicates with a memory heap 24 which, for example, can hold a series of data involving queue lists of information to be organized and managed.

The system clock 20 works with an operating system 18 which is in communication with the application programs 10, 12 and 14 and the CPU 16. A timer management unit 22 is controlled by the operating system and the application programs 10, 12 and 14, so that the timer management unit 22 can use the data in the memory heap 24 in order to manage and arrange a desired sequence of data items in a queue list which will be useful to the system shown in FIG. 1.

Figure 2:
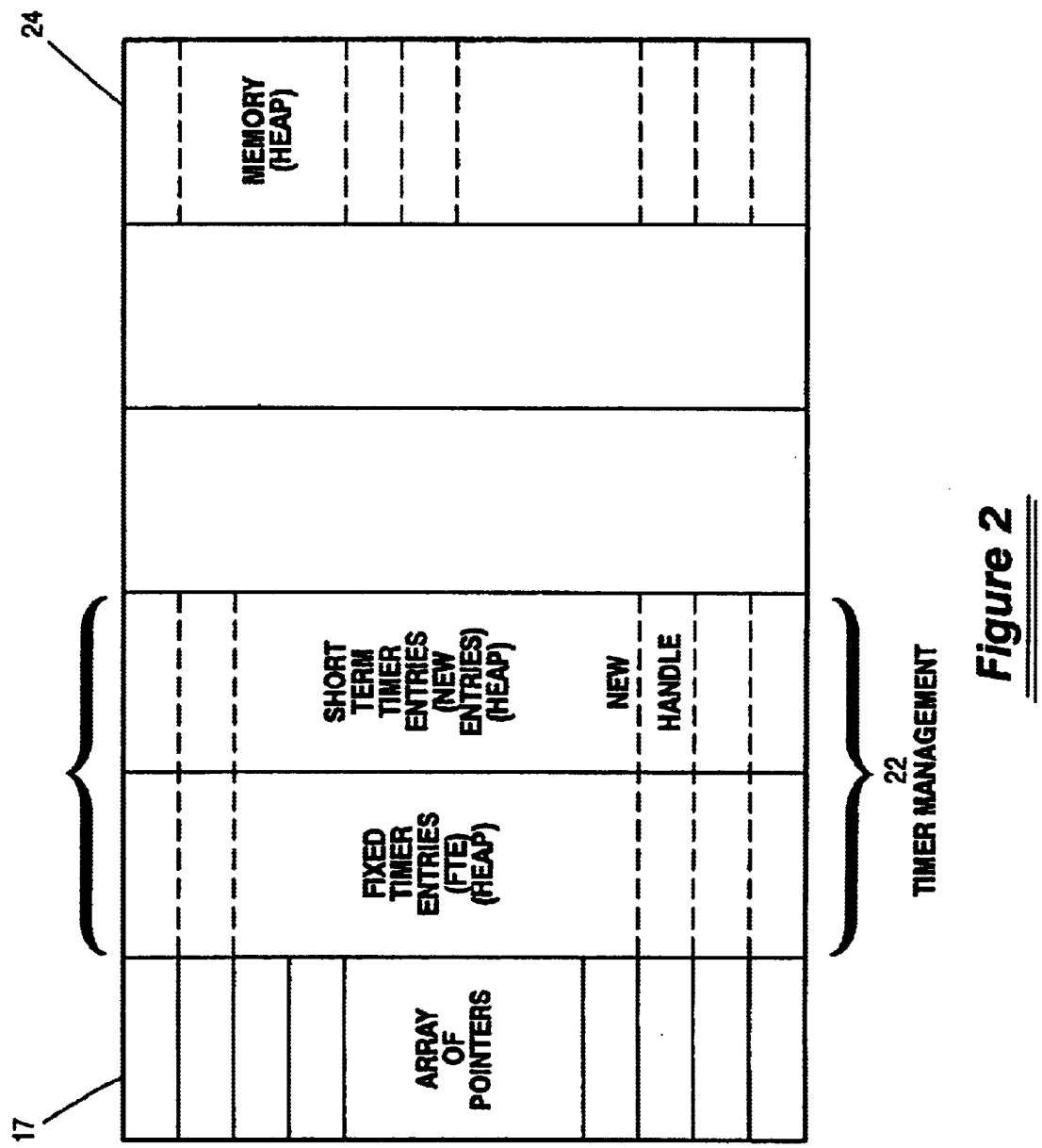
FIG. 2 is a schematic drawing showing the use of the memory heap and the array of pointers working with the timer management units which involve the fixed timer entries and the new short-term timer entries.

FIG. 2 is an illustration of some of the major functional units involved in the present queue management method. A memory heap 24 can be used for holding data of use to the system and may have some specialized areas designated as the timer management area 22. This timer management area 22 can hold a multiple number of pointers and also short-term timer entries. An array of pointer addresses 17 can be initiated by the CPU 16 in order to access and manage the Fixed Timer Entries and the short-term timer entries, called Transient Timer Entries (TTEs) or New Timer Entries (NTEs), in the timer management unit 22.

In many system networks, such as those which use Kerberos domains, the performance cost of queue searching for insertion of events which need to be handled at some fixed time in the future, can involve costly time delays. An arrangement of queues are often used for inserting events at some desired fixed time in the future and these queues are the easiest and simplest way to implement and maintain and to reflect the linear nature of the problem to be solved here.

Typical implementation of such a queue may involve searching the queue to find the appropriate insertion point and then perform the insertion of a particular piece of data in the queue. However, such a technique is inherently slow, and becomes increasingly more costly as more and more entries are added to the queue involved. The major difficulties are the time involved and the cost of mechanisms which must traverse throughout all the items in the queue in order to find the appropriate insertion point. This would involve what is called "linear sequencing".

Figure 3A:
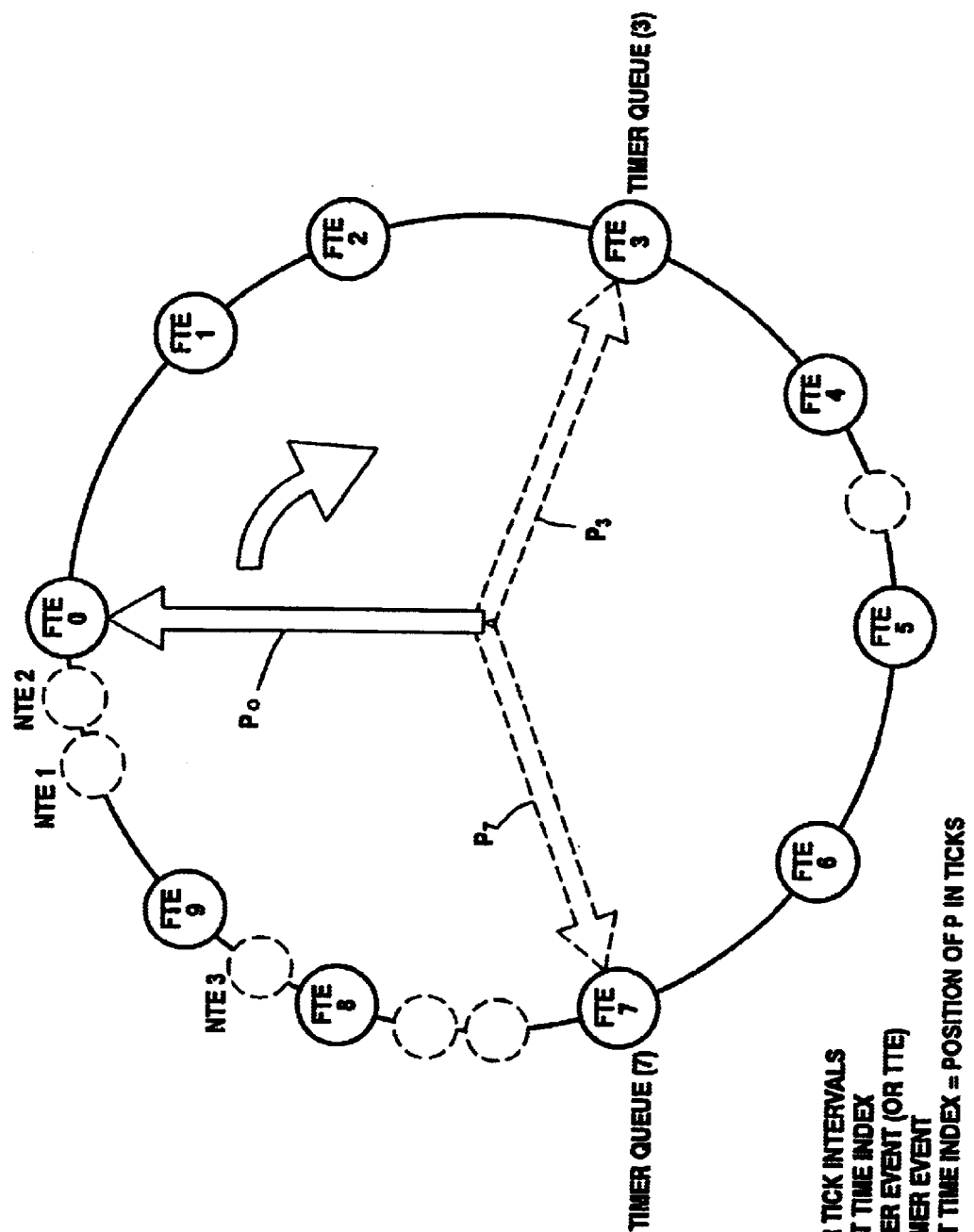
FIG. 3A is a schematic representation of the circular queue to be used for illustrative purposes.

Timer events which are organized and managed in a system network are generally maintained in a queue structure. Each timer event will have a value associated with it, and the value of the timer event determines when the event would happen after the "previous timer event" has happened. A timer queue (TQ) could be merely a linear sequence of events. However, the present queue configuration is organized as a circular queue as indicated in FIG. 3A and also in FIG. 4 which loops back upon itself.

For example, if there are five events which are to happen at t+3, t+8, t+45, t+55, and t+56, where t is the current time point selected. Then in this case, the queue will have the following type of appearance.

TE(3) - - - TE(5) - - - TE(37) - - - TE(10) - - - TE(1)

Thus, here above, the parenthesis number shows the time point for the timer event to happen in terms of time, so that the first item happened at t+3 and the second item happens 5 seconds later to give a total of t+8. The third item TE(37) represents t+45, where the addition of 3+5+37=45, and so on. Thus, the number in the parenthesis above are cumulative from the current time "t".

In the above scheme after one tick of the time unit used, that is to say, at t+1, the timer queue will then look as follows:

TE(2) - - - TE(5) - - - TE(37) - - - TE(10) - - - TE(1).

When this type of scheme or method is used, it is very time-consuming to insert a timer event in the queue as the timer entries need to be scanned from the "start" of the queue until the desired place is found, for example, if a new timer event is to be added which is to happen after 48 Timer ticks, then the entries in the timer will need to be sequentially scanned until an event is found which will happen after 48 Timer ticks. Here, the "new timer event" (NTE) needs to be inserted prior to that particular event. In the just previous example, it would then be necessary to scan four entries.

Now if a new event insertion designated as a new timer event NTE (TE_NEW) which is to happen after 48 Timer ticks, then the timer queue after the new event insertion will appear as follows:

TE(2) - - - TE(5) - - - TE(37) - - - TE(4) - - - NTE(6) - - - TE(1).

Thus, in the above line it is seen that there has been inserted an item NTE(6) which represents the timer event which is to happen after 48 Timer ticks, which is the sum of 2+5+37+4 ticks.

However, when a queue has thousands and thousands of entries, it will be seen that this scheme is very time-consuming in order to provide for a new event insertion.

In order to improve and implement a more efficient method for managing timer events, the present disclosure does not require any scan of the manyfold existing entries in a queue. As a result, this speeds-up the insertion of desired events at any particular desired point in the queue. In the present method, the timer queue is now maintained as a "circular queue", (FIG. 3A) This circular queue will have "N" permanent entries where "N" is a selectively chosen number, but still an arbitrary number. This number "N" determines the maximum or highest level timer event that can be handled by this particular scheme. For example, if the Timer tick is selected to be 100 milliseconds and the number of "permanent" entries "N" is selected as 9,000, then this queue will be able to handle any timer event up to 15 minutes after the selection point of the "current time".

Now referring to FIG. 3A, there is illustrated a circular queue, which for illustrative purposes, is shown to have 10 Fixed Timer Events. A pointer Po represents the current time index, "t". This however, is an adjustable item in time and may, for example, be located at P3, as the current time index, "t".

The first step involved would be an "initialization step" where the timer management module 22 would allocate "N" fixed timer event (FTE) entries, which in this case, the "N" would be equal to 10 (0–9). Then there is assigned a timer value of "1", to each of these fixed timer events (FTE). The timer entries are arranged so as to form a circularly-linked list. Then, the addresses of each of each of these timer entries are saved in an array designated (Timer Q [n]). This is an array 17 (FIGS. 2, 4) that is used to access the fixed elements of the queue directly. Then, a current Timer Index P (FIG. 3A) is assigned as the current_time_in_ticks mod N.

The next step is for entry insertion involves first converting the event time to Timer ticks. However, if the Timer ticks are greater than "N", then the program must exit since the set-up is not sufficient in size to handle this.

The next step for entry insertion of a New Timer Event (NTE) is to allocate a time event entry and then assign a timer value of "0" to this entry. The next step is to assign (current_time_in_ticks+new_timer_ticks) mod N to this Timer Index. The next step is to insert this new timer event entry (NTE) "prior" to the timer entry pointed to by the timer Q [this Timer Index].

As an illustrative example such as shown in FIG. 3A, this example will assume "N" to be 10, and the Timer tick to be 1 second. Thus, the Timer queue at initialization will present the following appearance.

TABLE I

| Timer Queue Index | |
|---|---|
| FTE(0) | ← timerQ[0] |
| FTE1(1) | ← timerQ[1] |
| FTE2(1) | ← timerQ[2] |
| FTE3(1) | ← timerQ[3] |
| FTE4(1) | ← timerQ[4] |
| FTE5(1) | ← timerQ[5] |
| FTE6(1) | ← timerQ[6] |
| FTE7(1) | ← timerQ[7] |
| FTE8(1) | ← timerQ[8] |
| FTE9(1) | ← timerQ[9] |

Table I shows the designation FTE as the Fixed Time Event which correlates with the markers on FIG. 3A. The (1) designates one Timer tick and it will be noted that the timer Q[0] and the timer Q[1] and timer Q[2], etc., all designate separate and individual Timer Indexes. Thus, it will be noted that each new tick (1) indicates an advancement of one timer step from the previous timer Q index.

It will be noted that the Timer Index was originally at position Po, (FIG. 3A) and the current time or Timer Q Index (Table I) will advance with each tick, so that for example at Timer Index P3 there has occurred 3 Timer tick intervals and P3 points to the Fixed Time Event 3. Here, it will be noted that the so-called current time "t" changes with each Timer tick interval so that for example, with the pointer at P3, the "current Time Index" is now located at FTE3, where as previously indicated, the designation FTE is the Fixed Timer Event.

Now assuming that the current time "t" is given a numerical or digital designation as 1234567. With this designation, the current Timer Index will be 7, (P7), FIG. 3A. That is to say, 1234567 "current time" moment at FTE7, in a circular queue of 10 FTE's where "N"=10 (total FTE's).

TIMER EVENT INSERTION

Now assuming that a new Timer Event (NTE) (TE_NEW) is to be added for 3 ticks with current Timer Index equal to 7. There is then allocated a new Timer Event entry designated (NTE1) [TE_NEW(1)]. Now, a calculation is made so that this designated Timer Index is to be "0", that is to say, 1234567+3 mod 10, (i.e. 3 ticks past Index 7). Thus, it is now desired that NTE1 be inserted prior to FTE0 as seen in FIG. 3A. (NTE1 will be inserted "previous" to FTE0. Thus, after insertion of NTE1 (New Timer Event) the timer queue will then appear as follows shown in Table II.

TABLE II

| Timer Queue Index | |
|---|---|
| TE_NEW(1) → NTE1(0) | ← timerQ[0] |
| FTE0(1) | ← timerQ[0] |
| FTE1(1) | ← timerQ[1] |
| FTE2(1) | ← timerQ[2] |
| FTE3(1) | ← timerQ[3] |
| FTE4(1) | ← timerQ[4] |
| FTE5(1) | ← timerQ[5] |
| FTE6(1) | ← timerQ[6] |
| FTE7(1) | ← timerQ[7] |
| FTE8(1) | ← timerQ[8] |
| FTE9(1) | ← timerQ[9] |

Here, it will be noted that the 3 Timer ticks after FTE7(1) will then pass as ticks from FTE7 to FTE8, then FTE8 to FTE9, then FTE9 to FTE(0), and then insert NTE1(0) just before (previous to) FTE0(1).

Now assuming that another new Timer Event (NTE) is to be added for 3 Timer ticks with the current Timer Index equal to 7, here an allocation is made for a new Timer Event entry designated (NTE2). Now calculating this designated Timer Index to be "0", that is to say 1234567+(ticks) mod 10. It is now desired to insert NTE2 "previous" to the Fixed Timer Event FTE0. This is seen in Table III, and in FIG. 3A.

TABLE III

| Timer Queue Index | |
|---|---|
| TE_NEW(1) → NTE1(0) | |
| TE_NEW(2) → NTE2(0) | |
| FTE0(1) | timerQ[0] |
| FTE1(1) | timerQ[1] |
| FTE2(1) | timerQ[2] |
| FTE3(1) | timerQ[3] |
| FTE4(1) | timerQ[4] |
| FTE5(1) | timerQ[5] |
| FTE6(1) | timerQ[6] |
| FTE7(1) | timerQ[7] |
| FTE8(1) | timerQ[8] |
| FTE9(1) | timerQ[9] |

Thus, as will be seen in Table III, there has now been inserted a new Timer Event designated NTE2(0) which occurs just after the Timer Event NTE1(0) and "previous" to FTE(0). It should be noticed that NTE1(0) and NTE2(0) have "0" in the notation to indicate "no timer ticks" are involved. Thus, from FTE9(1) to FTE0(1), the NTE1(0) and the NTE2(0) inserts still have only consumed one tick, but no timer ticks were used for NTE1 and NTE2.

This is shown in FIG. 3A, such that after the positioning of Timer Entry NTE1 there is shown another positioning of NTE2 which occurs before (previous to) the fixed timer entry FTE0.

As a further example, it is assumed that another new Timer Event (NTE) is to be added for 2 Timer ticks with current Timer Index equal to 7. Here, there is allocated a new Timer Event entry designated (NTE3). The calculation for this Timer Index is then set to be 9, that is to say, 1234567+2 mod 10. Here, it is desired to insert NTE3 just previous to the Fixed Timer Event FTE9.

After the insertion of NTE3 just previous to the Fixed Timer Event 9, the timer queue after this insertion of NTE3 will appear as shown in Table IV.

TABLE IV

| Timer Queue Index | |
|---|---|
| TE_NEW(1) → NTE1(0) | |
| TE_NEW(2) → NTE2(0) | |
| FTE0(1) | timerQ[0] |
| FTE1(1) | timerQ[1] |
| FTE2(1) | timerQ[2] |
| FTE3(1) | timerQ[3] |
| FTE4(1) | timerQ[4] |
| FTE5(1) | timerQ[5] |
| FTE6(1) | timerQ[6] |
| FTE7(1) | timerQ[7] |
| FTE8(1) | timerQ[8] |
| TE_NEW(3) → NTE3(0) | |
| FTE9(1) | timerQ[9] |

Now, as seen in Table IV, in addition to the series of Fixed Timer Events 0 through 8, the prior position of FTE9 is the "current Timer Index" so that the new Timer Event NTE3 is now inserted just before the Fixed Timer Event 9, as seen also in FIG. 3A.

Since the Timer Index in this case is equal to 7+2 Timer ticks, then the jump from 7 to 8, and 8 to the next event is 2 ticks, which puts the positioning of NTE3(0) [TE_NEW (3)] just next after the Fixed Timer Event FTE8(1), and before, in sequence, the Fixed Timer Event of FTE9.

Figure 3B:
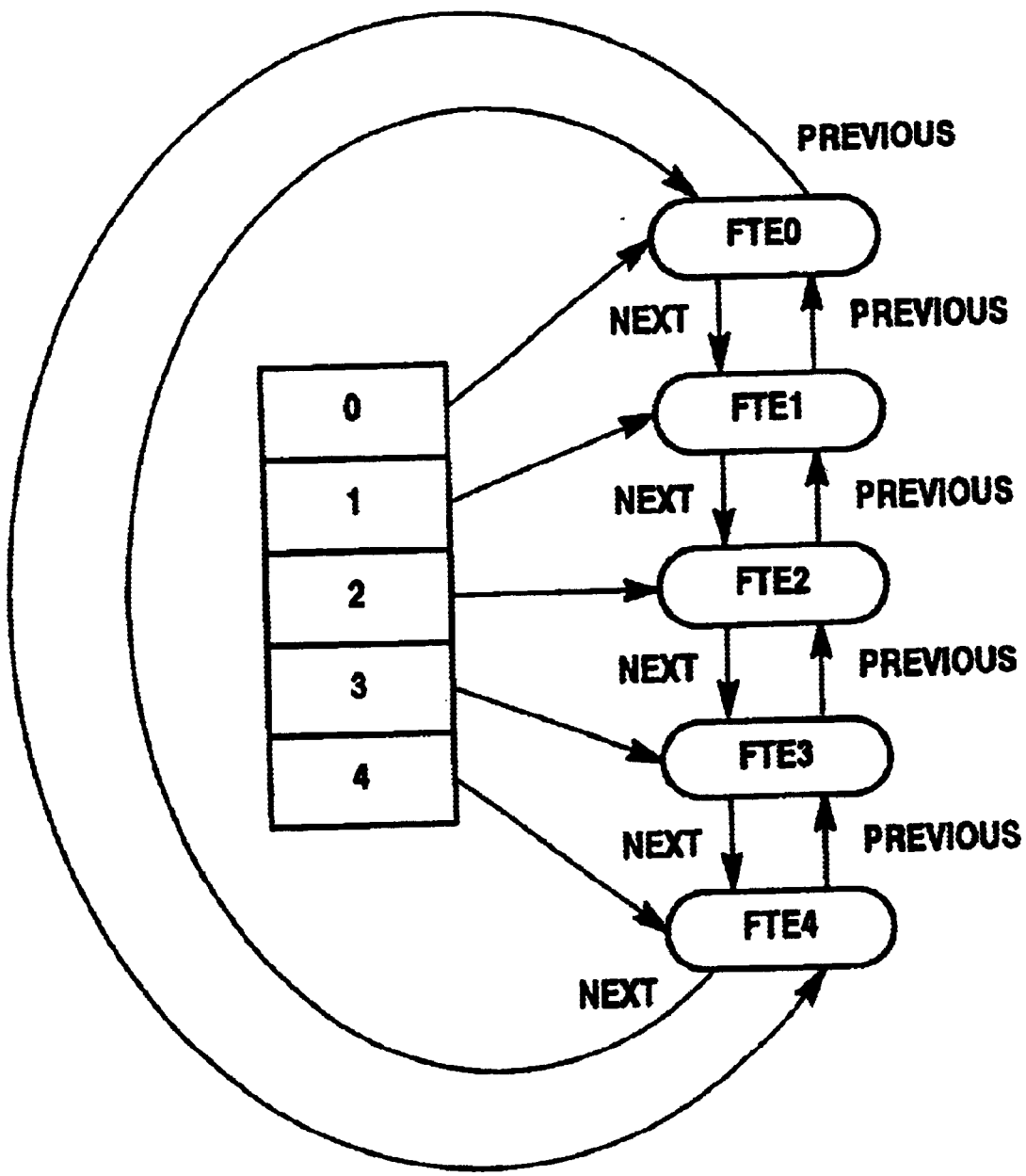
FIG. 3B is an illustration of pointers used for previous and next references to Fixed Timer Events.

FIG. 3B is a simplified illustration of inserting a New Timer Event (NTE) between two sequential Fixed Timer Events (FTE).

FIG. 3B shows an example of a simplified pointer array (mod 5) of addresses 0–4 with each address pointing to Fixed Timer Events FTE0, FTE1, FTE2, FTE3, and FTE4 which (in circular fashion) sequences back to FTE0. The FTE's are shown linked in sequence "0" to "4" and back to "0", and each FTE has a "previous" entry and a "next" entry. FIG. 3B is the situation "before" any New Timer entries are made.

Figure 3C:
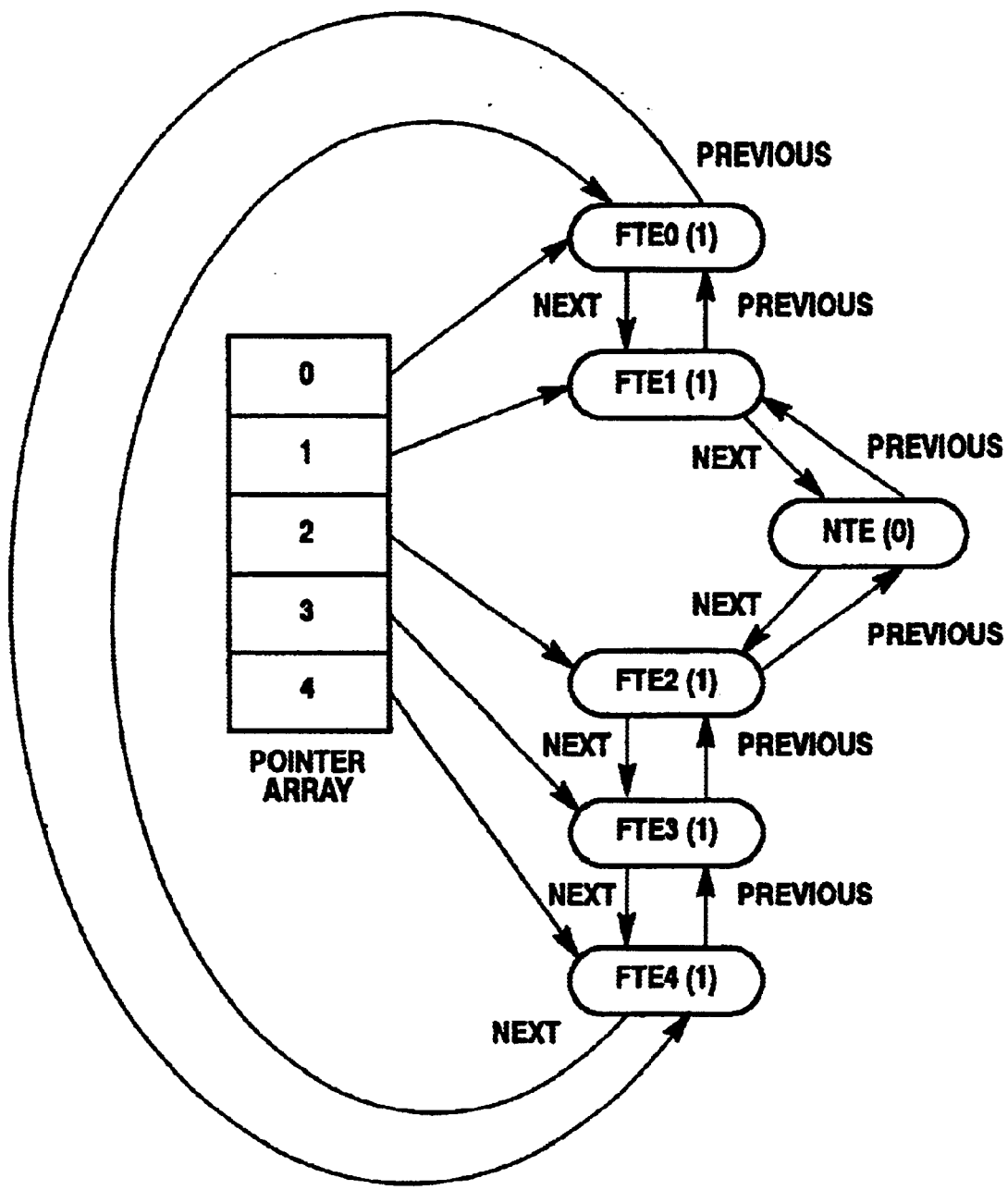
FIG. 3C is a drawing illustrating the situation after insertion of a New Timer Entry (NTE)

Now, when it is desired to insert a New Timer Event (NTE) between FTE1 and FTE2, the program of FIG. 3C will set the Timer Tick value to "0", then set the Current Timer Index (to indicate the placement of the new entry) current time in ticks mod N. Here N=5.

Now, FIG. 3C illustrates the situation "after" insertion of a New Timer Entry (NTE) and the use of the "next" and previous" pointers.

Here then, there is a setting of the NTE Timer Index—to Current Timer Index, plus Timer Ticks mod N. This would index 0 plus 2 Timer Ticks, as the insertion point (NTE) to be "previous" to the FTE2.

The program then assigns the NTE's previous pointer to FTE(1).

The program then assigns the NTE's next pointer to FTE(2).

The program then assigns FTE(1)'s next pointer to NTE. Thus, NTE(0) fits in after FTE(1) with 0 ticks.

The program then assigns FTE(2)'s previous pointer to NTE. Thus, NTE(0) fits in before FTE(2) with 0 ticks.

A Handle is then passed back to uniquely identify the NTE (New Timer Event) within the Timer Queue, where it has now been inserted.

Figure 4:
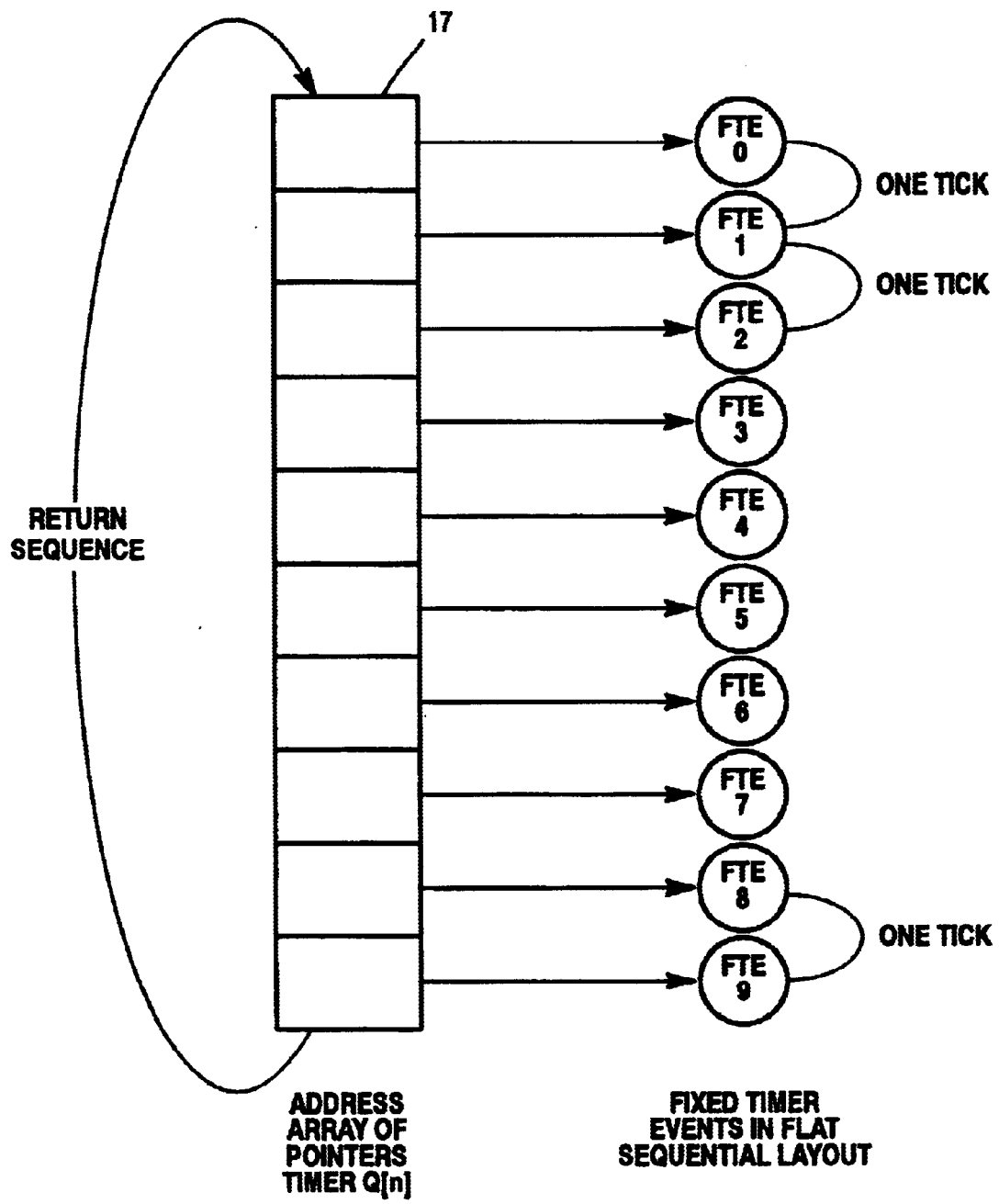
FIG. 4 is a schematic drawing of an array of pointers showing the Fixed Timer Events in a sequential fashion for easier illustration.

FIG. 4 is an illustration of how an address array of pointers 17 form a Timer Queue (TQ) of N addresses which sequence back from the last pointer at bottom to the original starting pointer at the top. Each pointer addresses a Fixed Timer Event (FTE) having an index from 0 through 9 when N=10. There is one timer tick consumed between each sequential FTE.

Figure 5:
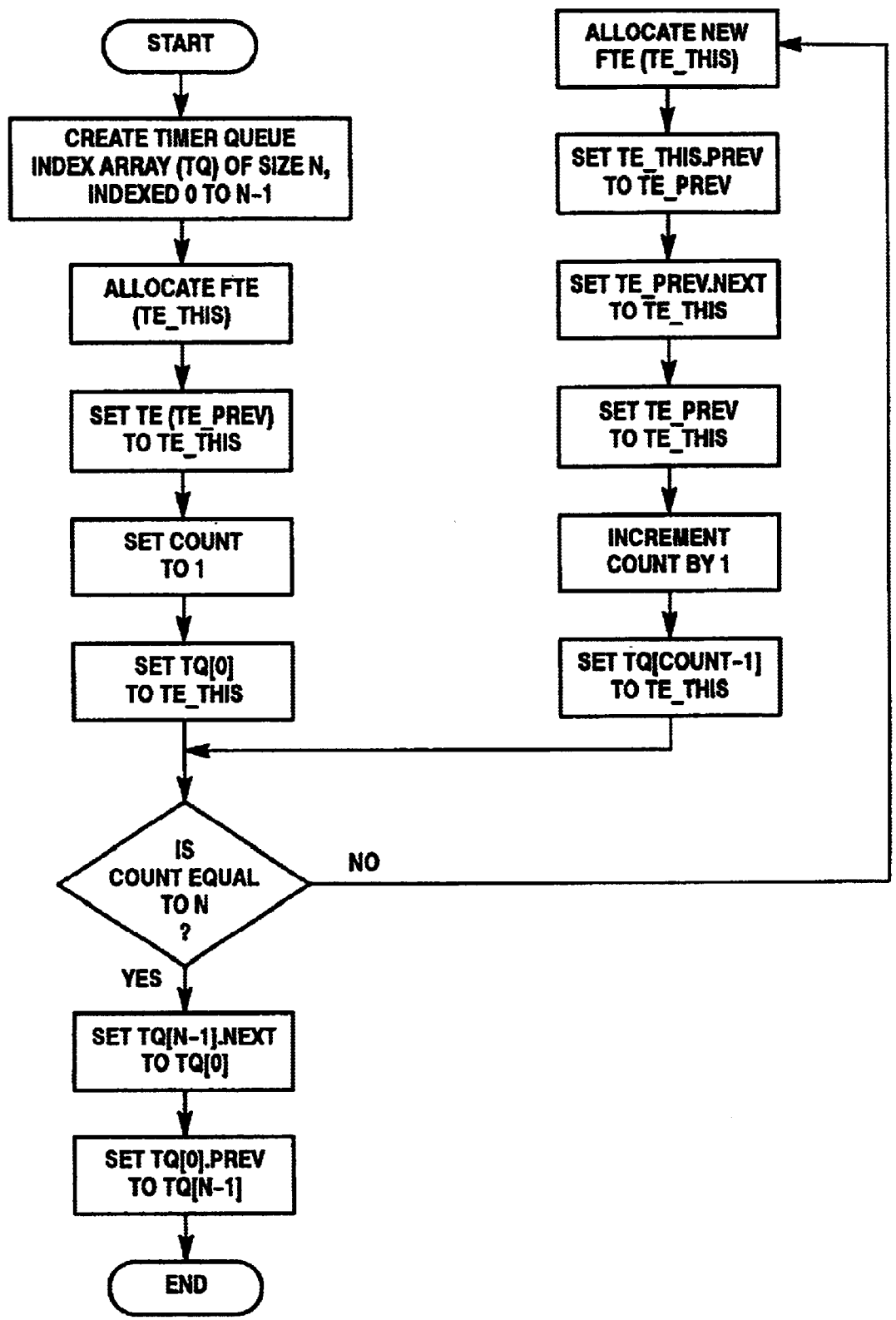
FIG. 5 is a flow chart showing the steps for creation of a circular queue.

FIG. 5 is a flow chart illustrating the creation of a Timer Queue. The Timer Queue is represented by the Timer Queue Index Array, which is an Address Array where each pointer within the array references a FTE, as was indicated in FIG. 4.

Each FTE will have a "previous pointer" pointing to the previous FTE referenced by the array, and a "next" pointer pointing to the next FTE referenced by the array. The FTE referenced by the first index of the array will assign a previous pointer to the FTE referenced by the last index of the array. The FTE referenced by the last index of the array will assign a next pointer to the FTE referenced by the first index of the array.

Now referring to the flow chart steps of FIG. 5, a sequence is shown of steps C1 through C8.

Step C1 involves creation of a Timer Queue Index Array, designated TQ, of size N which is indexed from 0 to N−1. There will be N Fixed Timer Events (FTE).

At step C2, the program will create an instance of a FTE designated TE_THIS.

At step C3, the program will create a reference to a TE designated TE_PREV. Then the program will set $TE_{13}$ PREV equal to TE_THIS.

At step C4, the program will set the Count, or the current number of FTEs, to 1.

At step C5, the program will set the Timer Queue "0" position equal to TE_THIS.

At step C6, a decision block considers the question of - - - is the Count, or the current number of FTEs, yet equal to N?

If the answer here is "NO" at this time, then step C6N1 will create a new Fixed Timer Event (FTE) designated TE_THIS.

Then step C6N2 will assign the previous pointer of TE_THIS to TE_PREV, thus creating a link from the current FTE to the previously created FTE. At step C6N3, the program will assign the "next" pointer of TE_PREV to TE_THIS, thus creating a link from the previously created FTE to the current FTE. By assigning a previous pointer in step C6N2 and a "next" pointer in step C6N3 for the two adjacent FTES (TE_THIS and TE_PREV), the FTEs become doubly linked, as was indicated in FIGS. 3B and 3C.

Step C6N4 then sets TE_PREV to the present timer event TE_THIS.

At step C6N5, the Count will be incremented by 1.

Step C6N6 works to set the FTE referenced by the Timer Queue (TQ) at index Count−1 to TE_THIS, and returns to C6.

Steps C6N1 through C6N6 will loop until N FTES have been created and doubly linked within the Timer Queue Index Array TQ.

Now, when step C6 is YES (Count=N), then step C7 operates to assign the next pointer for TQ at index (N−1) to TQ at index 0, thus creating a link from the last FTE to the first FTE.

At step C8, the program will assign the previous pointer for TQ at index 0 to TQ at index N−1, thus creating a link from the first FTE to the last FTE. By setting the "next" pointer in step C7 and the "previous" pointer in C8 for the first and last FTEs (TQ[0] and TQ[N−1]), all the FTEs referenced by TQ become Circularly Linked.

Thus, there has been created an Array having entries mapped to the Fixed Timer Events of the Circularly Linked List of FIG. 3A. The combination of the Address Array 17 (FIG. 2) and the circularly linked list (FIG. 3A) now form the Timer Queue.

Figure 6A:
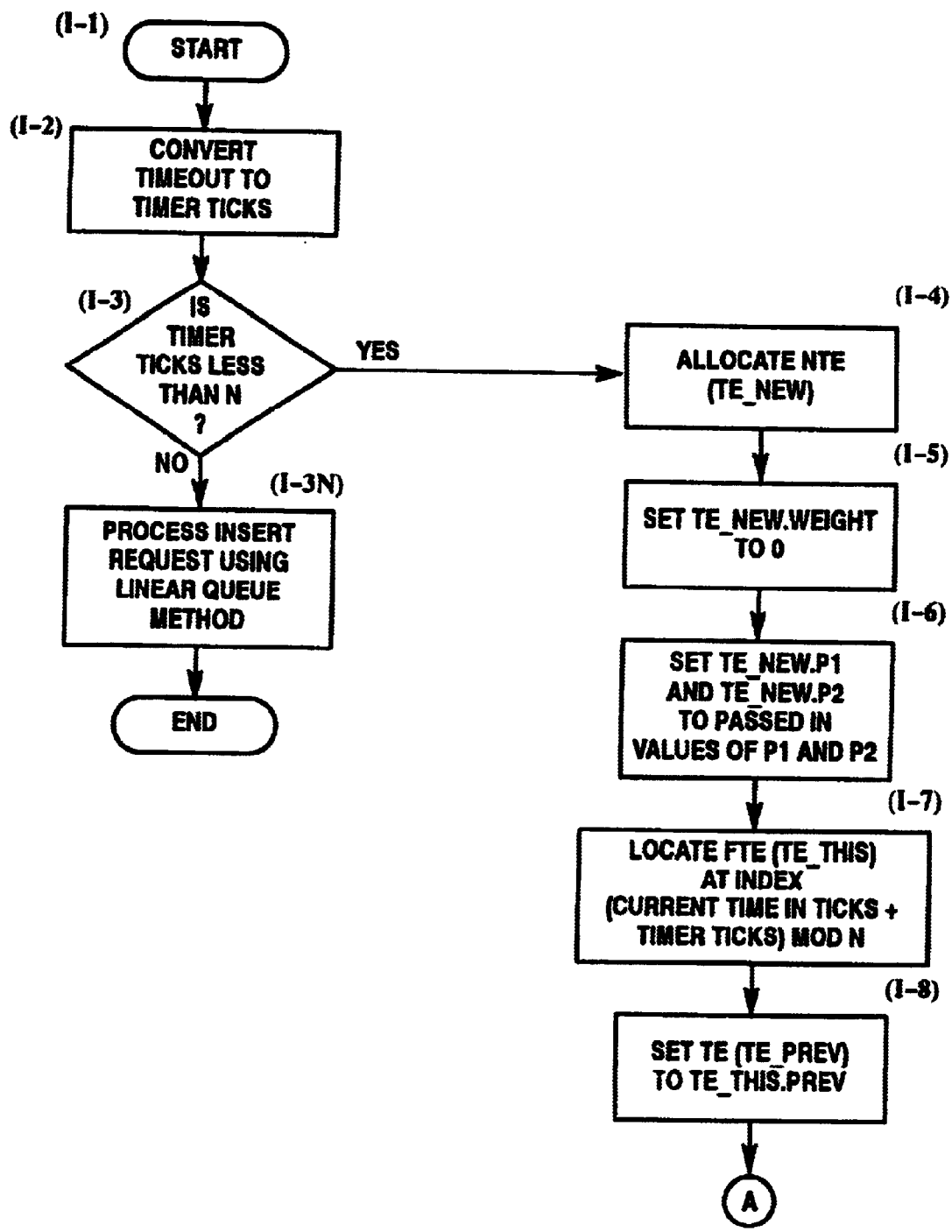
FIG. 6 includes FIGS. 6A and 6B for illustrating the insertion of a New Timer Event (NTE), (also called a Transient Timer Entry, TTE). 19.
Figure 6B:
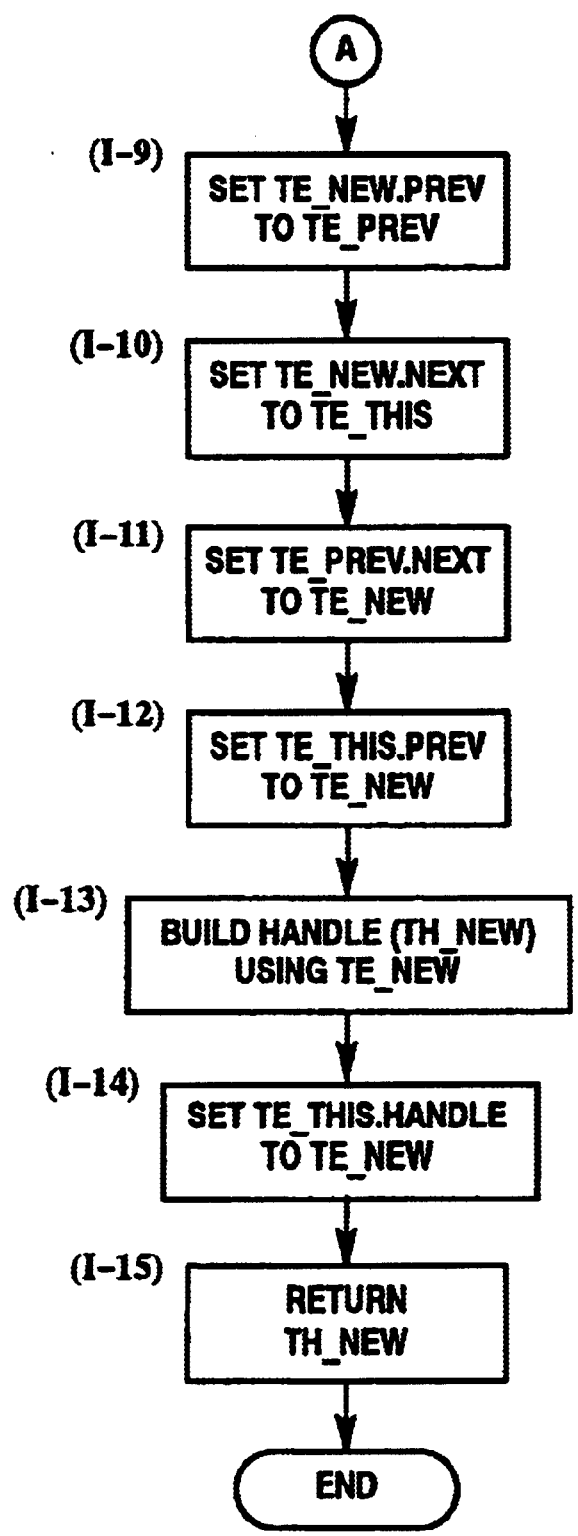

FIGS. 6A and 6B now show a flow chart, which illustrates the steps for insertion of a Timer Event in an established circular Timer Queue.

Referring to FIG. 6A, the start step at I-1 indicates that an Insertion Request for a New Timer Event (NTE) has been initiated. Then step I-2 operates to convert the Timeout period to Timer Ticks.

Step I-3 shows a decision block to query - - - are the Timer Ticks less than N? If this is NO (Timer Ticks greater than or equal to N), then at step I3N, the program will process a New Timer request by using a linear queue method and then exit.

At step I-3 when the timer ticks are less than N (YES), then Step I-4 operates to create a New Timer Event (NTE) designated TE_NEW.

Then step I-5 will set the Time Value to "0" so that TE_NEW.WEIGHT="0". As a result, the NTE will not consume any timer ticks. At step I-6, the program will set TE_NEW P1 and TE_NEW P2 to include the values ascribed to P1 and P2. This will specify the Event, or the occurrence of the process associated with TE_NEW.

At step I-7 the program will locate the Fixed Timer Event (FTE) where the insert will occur. This FTE is located at Index of Current Time In Ticks+Timer Ticks) mod N.

At step I-8, the program will create a reference to a TE designated TE_PREV. Then the program will set TE_PREV equal to the FTE "previous to" TE_THIS, or TE_THIS.PREV. The sequence then continues via marker A to FIG. 6B.

Step I-9 involves setting the "previous" pointer of TE_NEW to TE_PREV, thus creating a link from the NTE to the previous TE.

At step 1-10, the program sets the "next" pointer of TE_NEW to TE_THIS, thus creating a link from the NTE to the current FTE.

Step I-11 involves setting the next pointer of TE_PREV to TE_NEW, thus creating a link from the previous TE to the NTE.

Step I-12 sets the previous pointer of TE_THIS to TE_NEW, thus creating a link from the current FTE to the NTE.

Step I-13 builds a handle (reference to an address in memory) to identify a New Timer Entry (NTE) being inserted in the Timer Queue. TH_NEW (Timer Handle) is built from TE_NEW (of I-12).

Step I-14 involves assigning the handle for TE_THIS to TH_NEW, thus uniquely identifying TH_NEW within the Timer Queue.

Then at Step I-15, the sequence operates to return TH_NEW so that the program initiating the Insert Request can uniquely identify TH_NEW.

Thus, the New Timer Entry NTE (TE_NEW) will now exist in the Timer Queue at the designated point between two of the Fixed Timer Events (FTE's) which had been selected through the Current Timer Index in Ticks plus Timer Ticks selected.

Thus, it is seen that the present system utilizes a circular queue with a moving time-origin point. The moving time-origin point sets-up a new "start" reference point and provides an "end" point when the required number of ticks have been kicked past to the new position of New Timer Event insertion.

Thus, it is also seen that there is an immediate operation which allows multiple accessible insertion points to be placed within the queue with no requirement for a long-term scanning of every single event in a queue in order to find a new insertion point, as was required in previous systems.

While a preferred embodiment of the creation of a circular queue of N Fixed Entries with capability of inserting a temporary New Timer Entry between any two selected Fixed Entries has been described, it should be noted that other embodiments are possible which still are encompassed by the attached claims.

What is claimed is:

1. In a system holding a CPU with a heap memory and disk memory connected to a computer having access to multiple application programs, a method for creating a circular queue comprising the steps of:
   (a) creating a timer queue index array TQ of size N where N represents a series of Fixed Timer Entries (FTEs) which are indexed TQ [i], where i ranges from 0 to (N−1) wherein said creating includes:
      (a1) initiating the allocation of Fixed Timer Events by assigning the initial FTE to the index of "0" so that this initial FTE becomes indexed as TQ [0];
      (a2) counting one timer tick and setting the next FTE to an index of "1" so as to form a timer queue index TQ[1];
      (a3) counting a sequence of timer ticks until the last FTE becomes the timer index TQ[N−1];
      (a4) assigning the last FTE TQ[N−1] to revert back to the first FTE TQ [0] thus to establish a recurring loop event for the Fixed Timer Events (FTEs);
   (b) arranging said timer queue index array TQ so that the final FTE, TQ[N−1], will then revert to the first FTE TQ[0] to form a circular queue of N Fixed Timer entries.

2. The method of claim which includes the step of:
   (a) counting each index (i) in sequence with a timer counting means and utilizing a pointer (Pi) which points to each next Fixed Timer Event with the consumption of one timer-tick.

3. The method of claim 2 which includes the step of:
   (d) initiating a command sequence for insertion of a New Timer Entry (NTE) to be inserted between a first FTEa and a second next-consecutive FTEb;
   (e) accomplishing said NTE (New Timer Entry) insertion between FTEa and FTEb without consuming any timer tick counts.

4. The method of claim 3 wherein step (d) includes the steps of:
   (d1) locating the present moment pointer to find out how many timer ticks it resides from index (0), to establish the current time pointer Pi;
   (d2) allocating the number "X" of timer ticks after which the New Timer Entry (NTE) is to be inserted;
   (d3) counting timer ticks which will count "X" ticks beyond the current Pointer Pi to locate the Fixed Timer Event (FTE) at index Pi+"X";
   (d4) creating a pointer in the memory heap which assigns the NTE (new timer entry) as the next event after the prior located FTE (Pi=+X−1);
   (d5) creating a pointer to assign the next event after the NTE to be FTE (Pi=+X).

5. In a system holding a CPU with a heap memory and disk memory connected to a computer having access to multiple application programs, a method for creating a circular queue comprising the steps of:
   (a) creating a timer queue index array TQ of size N where N represents a series of Fixed Timer Entries (FTEs) which are indexed TQ [i], where i ranges from 0 to (N−1);
   (b) arranging said timer queue index array TQ so that the final FTE, TQ[N−1], will then revert to the first FTE TQ[0] to form a circular queue of N Fixed Timer entries;
   (c) counting each index (i) in sequence with a timer counting means and utilizing a pointer (Pi) which points to each next Fixed Timer Event with the consumption of one timer-tick;
   (d) initiating a command sequence for insertion of a New Timer Entry (NTE) to be inserted between a first FTEa and a second next-consecutive FTEb, wherein said initiating includes:
      (d1) locating the present moment pointer to find out how many timer ticks it resides from index (0), to establish the current time pointer Pi;
      (d2) allocating the number "X" of timer ticks after which the New Timer Entry (NTE) is to be inserted;
      (d3) counting timer ticks which will count "X" ticks beyond the current Pointer Pi to locate the Fixed Timer Event (FTE) at index Pi+"X";
      (d4) creating a pointer in the memory heap which assigns the NTE (new timer entry) as the next event after the prior located FTE (Pi=+X−1);
      (d5) creating a pointer to assign the next event after the NTE to be FTE (Pi=+X).
   (e) accomplishing said NTE (New Timer Entry) insertion between FTEa and FTEb without consuming any timer tick counts.

6. The method of claim 5 wherein step (a) includes the steps of:
   (a1) initiating the allocation of Fixed Timer Events by assigning the initial FTE to the index of "0" so that this initial FTE becomes indexed as TQ[0];
   (a2) counting one timer tick and setting the next FTE to an index of "1" so as to form a timer queue index TQ[1];
   (a3) counting a sequence of timer ticks until the last FTE becomes the timer index TQ [N−1];
   (a4) assigning the last FTE TQ [N−1] to revert back to the first FTE TQ [0] thus to establish a recurring loop event for the Fixed Timer Events (FTEs).

* * * * *